United States Patent [19]

Schulz et al.

[11] Patent Number: 4,518,757

[45] Date of Patent: May 21, 1985

[54] DRAG REDUCTION AGENT FOR HYDROCARBON LIQUID

[75] Inventors: Donald N. Schulz, Annandale; Kissho Kitano, Fanwood, both of N.J.; Terry J. Burkhardt, Crosby, Tex.; Arthur W. Langer, Watchung, N.J.

[73] Assignee: Exxon Research and Engineering Co., Florham Park, N.J.

[21] Appl. No.: 565,100

[22] Filed: Dec. 23, 1983

[51] Int. Cl.³ ............................................. C08F 220/10
[52] U.S. Cl. .................................... 526/329; 208/370; 585/3
[58] Field of Search ........................................ 526/329

[56] References Cited

U.S. PATENT DOCUMENTS

| | | | |
|---|---|---|---|
| 4,289,679 | 9/1981 | Mack | 585/523 |
| 4,358,572 | 11/1982 | Mack et al. | 585/524 |
| 4,371,455 | 2/1983 | Mack et al. | 252/429 |

FOREIGN PATENT DOCUMENTS 57-152767 9/1982 Japan.
57-188996 10/1982 Japan.
57-188997 10/1982 Japan.

Primary Examiner—Joseph L. Schofer
Assistant Examiner—J. M. Reddick
Attorney, Agent, or Firm—Richard E. Nanfeldt

[57] ABSTRACT

The present invention relates to improved drag reduction agents which are copolymers of an alpha olefin and a vinyl alkylenecarboxylic ester.

4 Claims, No Drawings

DRAG REDUCTION AGENT FOR HYDROCARBON LIQUID

FIELD OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate. When flow in the pipe is turbulent (flow Reynolds number—mean fluid velocity × pipe diameter ÷ fluid kinematic viscosity greater than about 2000) the relationship between pressure drop and flow rate can be altered by the addition of small amounts of certain high molecular weight linear polymers to the liquid. These polymers interact with the turbulent flow processes and reduce frictional pressure losses such that the pressure drop for a given flow rate is less, or the flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

BACKGROUND OF THE INVENTION

High molecular weight hydrocarbon soluble polymers, such as polyisobutylene, polystyrene, and several alpha olefins, have been demonstrated to reduce drag in turbulent flows of hydrocarbon liquids. Generally, the drag reduction effectiveness of these polymers improves with increasing molecular weight; however, the tendency for the polymers to permanently degrade via molecular scission in local extensional flows within pumps or turbulent pipeflows also increases with increasing polymer molecular weight. This invention discloses efficient drag reduction in hydrocarbon liquids resulting from a novel class of copolymers of an alpha olefin and a vinylalkylene carboxylic ester. The drag reduction agents of the instant invention are copolymers of an alpha olefin and a vinylalkylene carboxylic ester.

It is well known that alpha olefins can be polymerized in the presence of coordination catalysts (Ziegler Natta). These catalysts generally consist of materials such as transition metal halides (e.g., $TiCl_3$) and organometallic co catalysts (e.g., $R_3Al$ or $R_2AlCl$). Most of the efforts of this field have centered on maximizing catalyst activity and polymer stereoregularity/crystallinity (e.g., U.S. Pat. Nos. 3,116,274; 3,476,730; 3,156,681; 4,240,928). Items of commerce in this category are isotatic polypropylene and poly(1-butene). These stereoregular, crystalline polymers have excellent physical and mechanical properties and are well suited to forming molded objects such as pipe or tubing which require rigidity. However, these materials have limited use as polymer additives to hydrocarbon solutions (e.g., viscosifiers, drag reducers, antimist agents.)

A smaller body of knowledge exists on the preparation of ultra-high molecular weight noncrystalline alpha olefins, suitable for use as hydrocarbon viscosifiers, drag reducing agents, or antimist additives, etc. Examples of such art is found in U.S. Pat. Nos. 4,289,679; 4,358,572; 4,371,455 and British Pat. No. GR 2074,175A. The noncrystalline nature of these polymers make them amenable to easy dissolution in hydrocarbon media. However, these materials are completely nonfunctional and the solution properties of such can be optimized only be adjustment of polymer molecular weight (+distribution). In other words, there are no reactive groups on these chains suitable for modification or interaction.

Reports of functional alpha olefins in Ziegler Natta polymerizations are sparse. A notable exception is the copolymerization of propylene with the methyl ester of undecanoic acid (Japanese Patent Applications 57-152767, 57-188996, 57-188997). However, the product of this reaction is characterized by very low levels (0.1-0.3 mole %) of functional group incorporation. Also, this polymer product is highly crystalline and thus not useful as hydrocarbon viscosifiers, drag reducing agents or antimist additives.

The instant invention is distinguished from the functional/short chain alpha olefin art (Japanese Patent Applications 57-152767, 57-188996, 57-188997) by the lower levels of crystallinity. Thus, the instant composition is useful for hydrocarbon solution applications; e.g., drag reduction, viscosification, antimisting additives etc., whereas the crystalline polymers of prior art are not. Moreover, it is surprising that although the instant invention and the art in Japan Patent Applications 57-152767, 57-188996 and 57-188997 differ only in length of $R_1$, the instant invention achieves 2 to 5 times more functional group incorporation under similar process conditions.

U.S. Pat. No. 3,278,495 is directed to a terpolymer of ethylene, propylene and an unsaturated carboxylic acid and is clearly patentably and chemically distinct from the copolymers of the instant invention which are drag reduction agents.

U.S. Pat. No. 3,287,335 teaches a copolymer of an alpha olefin and a vinyl alkanoate or alkyl acrylate which are used for making films or textiles and are clearly patentably and chemically distinct from the polymers of the instant invention which are drag reduction agents.

The present invention discloses drag reduction agents for hydrocarbon liquids which are copolymers of an alpha olefin and a vinylalkylene carboxylic ester.

SUMMARY OF THE INVENTION

The present invention relates to unique and novel drag reduction agents for hydrocarbon liquids which are hydrocarbon solutions of water insoluble copolymers of an alpha olefin and a vinylalkylene carboxylic ester. The necessary concentration range of the copolymer in the hydrocarbon liquid in order to have an effective drag reduction agent is about 0.001 to about 1.00 grams polymer complex per 100 ml of hydrocarbon liquid.

The dry reduction agents of the instant invention are copolymers containing an alpha olefin and a vinyl alkylenecarboxylic ester having about 3 to about 20 carbon, more preferably about 9 to about 18 and most preferably about 10 to about 16, wherein the resulting alkylenecarboxylic ester side groups, are randomly distributed along the alpha olefin backbone. The alpha olefin has about 7 to about 27 carbon atoms, more preferably about 7 to about 15, and most preferably about 8 to about 12. The copolymer contains about 0.01 to about 5 mole % of the alkylenecarboxylic ester side groups, more preferably about 0.05 to about 3 and most preferably about 0.1 to about 2. The number average molecular weight as measured by GPC of the alpha olefin copolymer is about 10,000 to about 20,000,000, more preferably about 50,000 to about 15,000,000 and most preferably about 100,000 to about 10,000,000. The copolymers of the instant invention are characterized by the formula:

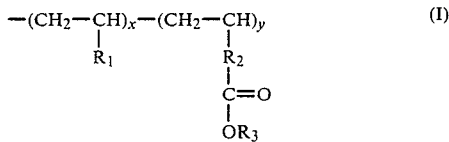

wherein $R_1$ is an alkyl group having about 5 to about 25 carbon atoms, $R_2$ is an alkylene group having about 1 to about 17 carbon atoms $R_3$ is an alkyl group having about 1 to about 25 carbon atoms, x is about 99.99 to about 95.0 mole %, more preferably about 99.95 to about 97.0 and most preferably about 99.90 to about 98.0. and y is about 0.5 to 5.0 mole%.

A preferred example of I is a copolymer of 1-octene and methyl-10-undecenoate ester.

The present invention also discloses a process for preparing alpha olefin ester copolymers (I) involving heating a long chain alpha olefin

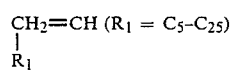

with a long chain ester alpha olefin

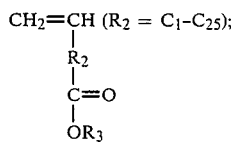

$R_3 = C_1-C_{25}$) from 25°–80° C. in the presence of a low aluminum content $TiCl_3$ based catalyst and diethyl aluminum chloride as a cocatalyst. The long chain alpha olefin is used as the solvent. The ratio of the long chain alpha olefin to the ester is about 100/1.

The copolymers of the alpha olefins and the vinyl alkylenecarboxylic ester are formed by the process according to the steps of forming a mixture of an alkane solvent, the alpha olefin and the vinyl alkylene carboxylic ester and diethyl aluminum chloride; reacting the mixture from 0° C. to 60° C.; adding a solution of $TiCl_3$ based catalyst in an alkane to said mixture and stirring for a sufficient period of time to cause copolymerization; terminating the reaction with isopropanol and precipitating the polymer from the reaction solution.

DESCRIPTION OF THE PREFERRED EMBODIMENTS

The following examples illustrate the present invention without, however, limiting the same hereto.

EXAMPLE 1

All solvents were dried by $N_2$ sparging to <2 ppm water. The methyl 10-undecenoate was dried over $CaH_2$. The $TiCl_3$ based catalyst which was used in the polymerization was prepared according to U.S. Pat. No. 4,240,928 and contained very low aluminum.

A two liter resin flask was charged with a mixture of n-heptane (230 ml), 1-octene (250 ml), methyl 10-undecenoate (3.2 g) and diethyl aluminum chloride (36 m mole), and heated to 60° C. The $TiCl_3$ based catalyst (1.0 g) was then added with 20 ml heptane. After stirring for 17 minutes, the reaction was terminated with isopropanol (2400 ml). The polymer settled overnight and was recovered by filtration, vacuum dried at 60° C. overnight to yield 29.0 g of polymer A. The inherent viscosity of the polymer was 3.73 in decalin. Ester content was estimated from IR (c=0) to be 0.8±0.2 mole %.

EXAMPLE 3

Example 2 was repeated but no methyl 10-undecenoate was used. The reaction was terminated in ten minutes to yield 35.2 g of polymer C. The inherent viscosity of the polymer was 4.18 in decalin.

EXAMPLE 4

Example 3 was repeated but only 10 mmoles diethyl aluminum chloride was used. The reaction was terminated in 15 minutes to give 39.7 g of polymer D. The inherent viscosity of the polymer was 4.12 in decalin.

EXAMPLE 5

The polymer (100 ppm) prepared in Example 1 was added to xylene and placed in 2 mm diameter drag reduction loop with pressure drop of 112 kPa/meter containing polymer showed a 25% flow enhancement.

EXAMPLE 6

A one liter resin flask was charged with a mixture of toluene (205 ml). Methyl-10-undecenoate (0.96 g), diethyl aluminum chloride (16.8 mmole), and 1-octene (75 ml), at 25° C. The $TiCl_3$ based catalyst (0.3 g) was then added with 20 ml toluene. After stirring for 20 minutes at 25° C., the reaction was terminated with small amount of isopropyl alcohol. The product was purified as described in Example 1 to give 8.5 g of polymer. The viscosity was 99 cps in a 2 wt.% xylene solution at the shear rate of $30s^{-1}$. About 1 mole % of ester content was observed by means of IR spectroscopy.

EXAMPLE 7

Example 6 was repeated but at 0° C. instead of 25° C. The reaction was terminated in 1 hour to yield 2.3 g of polymer. The viscosity was 201 cps in a 2 wt.% xylene solution at the shear rate of $30s^{-1}$.

EXAMPLE 8

Example 6 was repeated but 150 ml of 1-octene, 12.8 mmole of diethyl aluminum chloride, and 150 ml of toluene were used. The reaction was terminated in 30 minutes to yield 15.4 g of polymer G. The viscosity was 218 cps in 2 wt.% xylene solution at $30s^{-1}$. Ester content of the product was about 0.5 mol %.

EXAMPLE 9

Example 6 was repeated but 1.92 g of methyl-10-undecenoate and 21.6 mmole of diethyl aluminum chloride were used. The reaction for 1 hour gave 16.0 g of polymer H having the viscosity of 78 cps in 2 wt.% xylene solution at $305^{-1}$. Two mole % of ester group was observed.

EXAMPLE 10

A copolymer is also prepared by supported catalyst, according to the following recipe at 60° C.:

158 ml octene-1 (112 g) (1 mol)

1.9 g methyl 10-undecanoate (0.01 mol)
420 ml of n-heptane
10 ml 0.5 m $Et_2AlN(C_6H_5)_2$ (0.05 mol) and 0.1 g supported catalyst prepared by placing $MgCl_2$ (0.4 mol), ethyl benzoate (0.08 mol) and $TiCl_4$ (0.08 mol) in a dry Shatter Box (Spex Industries, 6.5 in.diam.) and ground one hour. The yellow solids were slurried in $TiCl_4$ (162.4 ml) at 138 degrees C. for four hours. Additional preheated $TiCl_4$ (162.4 ml) was added. The slurry was filtered hot, washed five time with n-heptane at 50 degrees C., and dried. The titanium content was 2.5 wt.%.

After initiation additional quantities of $Et_2AlN(C_6H_5)_2$ and ethyl aluminum dichloride are added. Whatever polymer formed is precipitated into 1 liter isopropyl alcohol.

What is claimed is:

1. A copolymer having the formula:

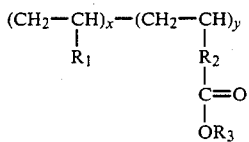

wherein $R_1$ is an alkyl group having about 5 to about 25 carbon atoms, $R_2$ is an alkylene group having about 1 to about 17 carbon atoms and $R_3$ is an alkyl group having about 1 to about 25 carbon atoms, x is about 95.0 to about 99.95 mole % and y is about 0.05 to about 5.0 mole %.

2. A copolymer according to claim 1, wherein $R_1$ has 6 carbon atoms, $R_2$ has 7 carbon atoms and $R_3$ has one carbon atom.

3. A method for reducing the frictional drag of a hydrocarbon solution in flow through pipes comprising adding a quantity of a copolymer to said hydrocarbon solution, said copolymer having the formula:

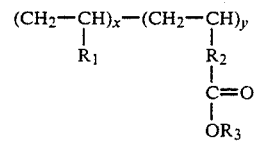

wherein $R_1$ is an alkyl group having about 5 to about 25 carbon atoms, $R_2$ is an alkylene group having about 1 to about 17 carbon atoms and $R_3$ is an alkyl group having about 1 to about 25 carbon atoms, x is about 95.0 to about 99.95 mole % and y is about 0.05 to about 5.0 mole %.

4. A method according to claim 3, wherein $R_1$ has 6 carbon atoms, $R_2$ has 8 carbon atoms and $R_3$ has one carbon atom.

* * * * *